United States Patent
Froggatt (10) Patent No.: US 7,538,883 B2
(45) Date of Patent: May 26, 2009

(54) DISTRIBUTED STRAIN AND TEMPERATURE DISCRIMINATION IN POLARIZATION MAINTAINING FIBER

(75) Inventor: Mark E. Froggatt, Blacksburg, VA (US)

(73) Assignee: Luna Innovations Incorporated, Roanoke, VA (US)

( * ) Notice: Subject to any disclaimer, the term of this patent is extended or adjusted under 35 U.S.C. 154(b) by 48 days.

(21) Appl. No.: 11/808,260

(22) Filed: Jun. 7, 2007

(65) Prior Publication Data
US 2008/0002187 A1  Jan. 3, 2008

Related U.S. Application Data

(60) Provisional application No. 60/814,088, filed on Jun. 16, 2006.

(51) Int. Cl.
   *G01B 9/02*   (2006.01)
   *G01L 1/24*   (2006.01)
   *G01N 21/00*  (2006.01)

(52) U.S. Cl. ............ 356/477; 356/35.5; 356/73.1

(58) Field of Classification Search .......... 356/35.5, 356/73.1, 477
   See application file for complete search history.

(56) References Cited

U.S. PATENT DOCUMENTS

| | | | |
|---|---|---|---|
| 5,064,270 A | | 11/1991 | Turpin et al. |
| 5,268,741 A | | 12/1993 | Chou et al. |
| 5,317,147 A | | 5/1994 | Dandliker et al. |
| 5,636,021 A | * | 6/1997 | Udd ................ 356/483 |
| 5,880,824 A | | 3/1999 | Uchiyama et al. |
| 6,097,488 A | | 8/2000 | Grek et al. |
| 6,229,599 B1 | | 5/2001 | Galtarossa |
| 6,744,950 B2 | | 6/2004 | Aleksoff |
| 6,946,646 B2 | | 9/2005 | Chen et al. |
| 7,126,678 B2 | | 10/2006 | Fayolle et al. |
| 7,330,245 B2 | * | 2/2008 | Froggatt .............. 356/73.1 |
| 7,440,087 B2 | * | 10/2008 | Froggatt et al. ........ 356/73.1 |

OTHER PUBLICATIONS

Huttner et al., "Local Birefringence Measurements in Single-Mode Fibers with Coherent Optical Frequency-Domain Reflectometer", IEEE Photonics Technology Letters, vol. 10, No. 10, Oct. 1998.

(Continued)

*Primary Examiner*—Michael A Lyons
(74) *Attorney, Agent, or Firm*—Nixon & Vanderhye P.C.

(57) ABSTRACT

A portion of a polarization maintaining (PM) optical fiber having two polarization states is analyzed. First and second spectral responses of the PM fiber portion are determined. In a preferred implementation, the spectral responses are determined using Optical Frequency Domain Reflectometry (OFDR). Each polarization state of the PM fiber portion has a corresponding spectral component in the first spectral response. First and second spectral analyses of the PM fiber portion are performed using the first and second spectral responses. Based on those spectral analyses of the PM fiber portion, a first physical characteristic affecting the PM fiber portion is determined that is distinct from a second different physical characteristic affecting the fiber portion. Example physical characteristics include temperature and strain. An output signal related to the first physical characteristics affecting the fiber portion is provided, e.g., for display, further processing, etc.

34 Claims, 10 Drawing Sheets

OTHER PUBLICATIONS

U.S. Appl. No. 11/062,740, filed Jan. 24, 2005; Inventors: Froggatt et al.
U.S. Appl. No. 11/371,229, filed Mar. 9, 2006; Inventor: Froggatt.
Limberger et al., "OLCR Characterization of Efficient Bragg Gratings in Optical Fiber", SPIE vol. 2044, pp. 272-283.
Wayne V. Sorin, "High Resolution Optical Fiber Reflectometry Techniques", SPIE vol. 1797 Distributed and Multiplexed Fiber Optic Sensors II (1992); pp. 109-118.

Notification of Transmittal of the International Search Report and the Written Opinion issued in PCT/US07/13471 dated Feb. 8, 2008.

International Preliminary Report on Patentability mailed Dec. 16, 2008 in corresponding Application PCT/US2007/013471.

* cited by examiner

DISTRIBUTED STRAIN AND TEMPERATURE DISCRIMINATION IN POLARIZATION MAINTAINING FIBER

CLAIM OF BENEFIT OF PROVISIONAL PATENT APPLICATION

Priority is claimed from U.S. Provisional Patent Application No. 60/814,088, filed on Jun. 16, 2006. The contents of this provisional application are incorporated by reference.

RELATED APPLICATIONS

This application is related to U.S. patent application Ser. No. 11/062,740, filed on Jan. 24, 2005, and U.S. patent application Ser. No. 11/371,229, filed on Mar. 9, 2006, the contents of which are incorporated by reference.

TECHNICAL FIELD

The technical field relates to optical measurements, and more particularly, to advantageous new uses of Optical Frequency Domain Reflectometry (OFDR).

BACKGROUND AND SUMMARY

Mixing between a reference signal and a data signal is often necessary to extract information about an optical device or network. A probe signal and a reference signal originating from the same source are typically mixed, resulting in fringes that can be detected and used to assess information about the device being probed. In interferometric sensing, a reference signal is mixed with a signal whose phase and/or amplitude is modified by a parameter to be measured. The mixing produces an interference signal, and the amplitude of the interference signal depends on how efficiently the two optical signals mix.

Optical Time-Domain Reflectometry (OTDR) is a widely used tool for identifying problems in large optical networks. OTDR instruments provide measurements of the level of scatter present in a section of fiber, or at a discrete interface over long distances. Optical Frequency Domain Reflectometry (OFDR) may be used to provide data similar to that provided by OTDR over shorter ranges (tens of meters for OFDR instead of 1000's of meters for OTDR) and higher resolutions (tens of microns for OFDR instead of tenths of meters for OTDR). This change in distance scale allows OFDR to be used in applications where the dimensions of interest are centimeters instead of meters such as when optical coupler and switch networks are constructed. For example, OFDR may be used in module-level and sub-module-level diagnostics. The ability of OFDR to measure the complex spectral reflectivity of Rayleigh backscatter as a function of fiber length yields surprising new and very useful results and will be discussed later.

Scatter is the process of redirecting the propagation of light. In an optical fiber, this occurs when light encounters a change in the geometry of the fiber core, or a change in the local index of refraction of a fiber. Scatter generally occurs at any interface such as connectors, poor splices, collimating optics, etc. Typically, light scattered from the forward propagating direction into the backward propagating direction is of primary concern and is called a reflection. Rayleigh scatter, in the context of optical fiber, describes the light scattered in the fiber due to the random nature of the glass structure in and around the fiber core. Although Rayleigh scatter is random in nature, it is fixed because the random pattern of the glass structure is "frozen" into the fiber. Loss is the removal of light from the intended forward propagating mode. Scatter is a form of loss, as is bend radiation and molecular absorption.

Scattered light may be measured and characterized using OFDR. A highly monochromatic beam of light is injected into the optical system or device to be tested. The wavelength/frequency of that light is varied with a time-linear sweep, and the optical signal back-scattered from the optical system is detected by coherently mixing the back-scattered signal with the reference input signal. The beat frequency component of the mixed signal, (corresponding to an interference signal), is measured to determine a position of the back-scattering (reflection) point in the optical system/fiber. The interference signal amplitude also determines a back-scattering factor and an attenuation factor for the reflected light.

U.S. patent application Ser. No. 11/062,740, filed on Jan. 24, 2005, describes ways to use complex data obtained from OFDR measurements of backscatter for an optical device under test (DUT). A fiber segment DUT is identified by itself within a longer fiber DUT or within an optical network DUT that includes multiple fibers coupled to perform one or more functions. OFDR backscatter data, such as a Rayleigh scatter pattern, is used to identify where in a DUT (and for a DUT with plural fibers, in which fiber) a loss occurred and to identify where in a DUT (and for a DUT with plural fibers, in which fiber) a change occurred (e.g., a temperature change resulting in a change in fiber length). Specifically, a detected scatter pattern for an optical fiber is compared to (e.g., cross-correlated with) a reference scatter pattern to determine a characteristic of the optical fiber.

Figure 1:
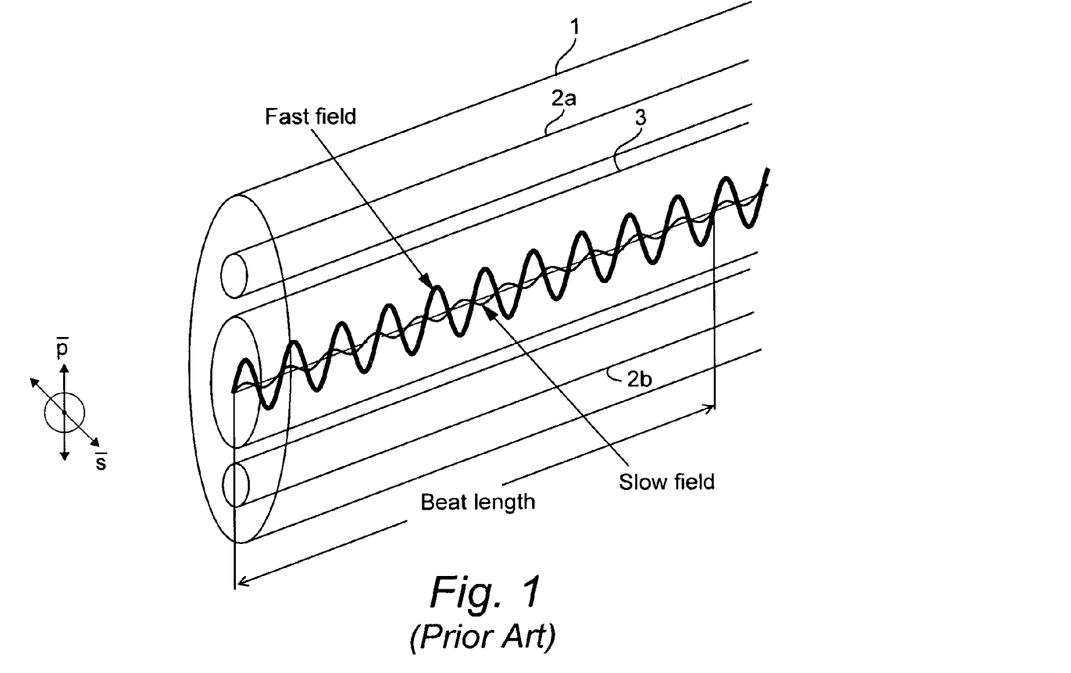
FIG. 1 illustrates beat length in an optical fiber.

U.S. patent application Ser. No. 11/371,229, filed on Mar. 9, 2006, describes calculating birefringence in a waveguide based on Rayleigh Scatter. Birefringence is related to the "beat length" (which is different from "beat frequency") of a polarization maintaining (PM) fiber. FIG. 1 conceptually illustrates beat length. A polarization maintaining (PM) optical fiber 1 includes two stress rods 2a and 2b and a waveguide core 3. Light propagating along the core 3 includes two perpendicular polarization vectors, commonly labeled "p" and "s". These perpendicular polarization vectors correspond to two perpendicular electro-magnetic (EM) fields (only the electric fields are illustrated to simplify the figure and demonstrate the principle). To be a PM fiber, coupling between the two EM fields needs to be minimized so that energy from one polarization/field "mode" is not transferred to the other polarization/field "mode". That mode coupling decreases as a phase velocity difference between the two polarizations/fields increases.

The stress rods 2a and 2b, which have a different thermal coefficient and index of refraction than the core 3, create a phase velocity difference between the two polarizations/fields. The "fast" electric field shown as the thicker sine wave corresponds to a "fast mode," and the "slow" electric field shown as the thinner sine wave corresponds to a "slow mode." The fast mode and slow mode light waves have different phase velocities. The light in the fast mode will have a longer wavelength than the light in the slow mode. As a result, the two electric fields change in phase relative to another as they propagate down the fiber. The two fields start in phase, and then after changing phase by 360 degrees over a certain distance along the fiber, they are back in phase. The distance over which this phase realignment takes place is the "beat length."

Figure 2:
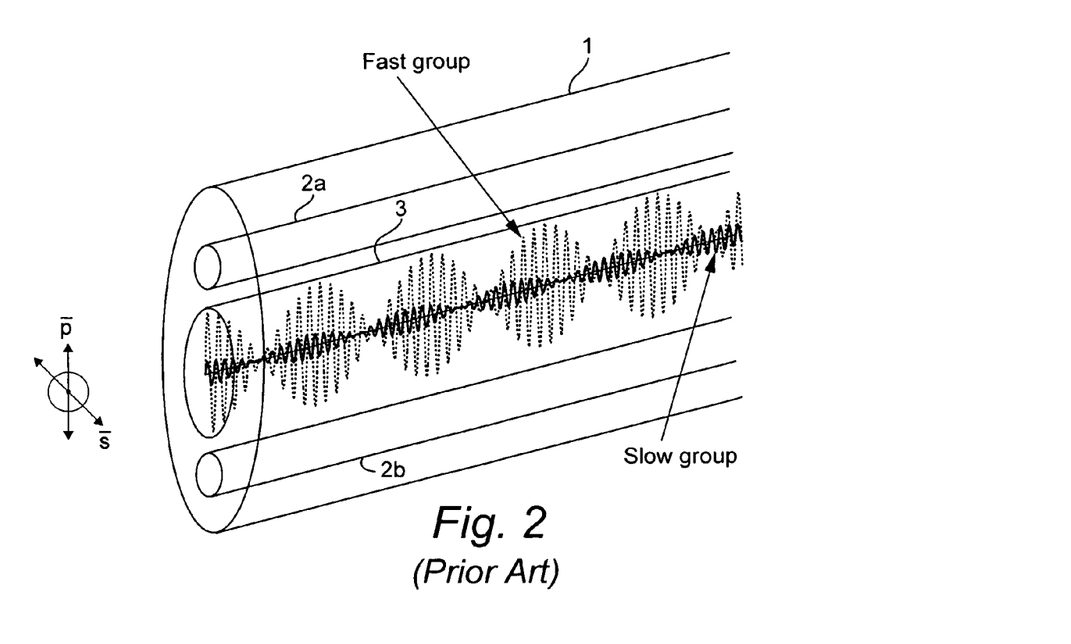
FIG. 2 illustrates beat notes propagating down a fiber at different group velocities.

The beat length is a useful parameter to measure for a PM fiber or other optical device because it represents the degree of polarization coupling, (which is usually undesirable), in that PM fiber. A shorter beat length means less mode coupling and a better PM fiber. But beat length should not be confused with a difference in group velocities. As shown in FIG. 2, when two closely spaced wavelengths are present, they form "beatnotes" in each of the modes of the PM fiber corresponding to the envelope waveforms as opposed to the underlying higher frequency waveforms that create the envelopes. The slow and fast envelopes propagate down the fiber at different group velocities. These group velocities can be substantially different from the phase velocities that create the beat length.

Birefringence and beat length are related, and one can be readily calculated from the other. A birefringent material causes different light polarization modes to travel at different speeds through the birefringent material, and birefringence is the degree to which a light wave with two polarizations is split into two unequally reflected or transmitted waves when it travels through a birefringent material. More formally, birefringence, $\Delta n$, is given by:

$$n_{slow} - n_{fast} = \Delta n \quad (1)$$

where $n_{slow}$ and $n_{fast}$ are the refractive indices for the slow and fast propagation modes, respectively. The beat length d is related to birefringence in accordance with the following:

$$d = \frac{\lambda}{n_{slow} - n_{fast}} \quad (2)$$

where $\lambda$ is the nominal operating wavelength (in a vacuum), e.g., a center wavelength of operation of a system where the PM fiber is incorporated or the design wavelength of the fiber.

Figure 3:
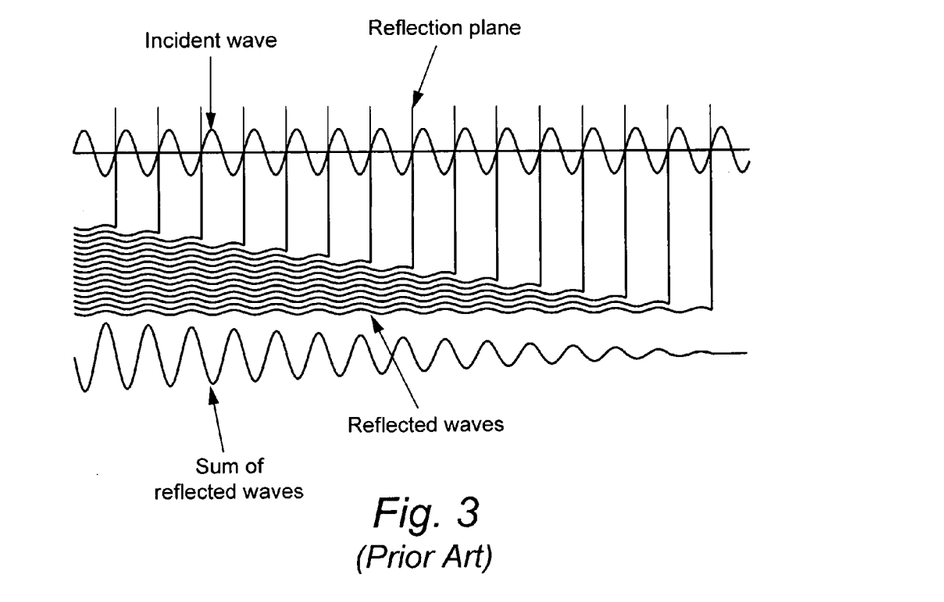
FIG. 3 illustrates resonant reflection of a light wave from a periodic reflector like a Bragg grating.

A Bragg grating can be used to measure birefringence. It is a periodic reflector made up of periodically spaced zones physically formed in or on a section of fiber. The spacing is determined to have a refractive index slightly higher than the fiber core. That spacing reflects a narrow range of wavelengths while transmitting others. FIG. 3 shows conceptually a resonant reflection of a light wave from a Bragg grating. The amplitude of the sum of reflected waves changes linearly with the number of reflections. The frequency of reflection is related to the phase velocity of the transmitted light. The phase velocity of a wave is the rate at which the phase of the wave propagates in space. This is the velocity at which the phase of any one frequency component of the wave will propagate. In other words, one particular phase of the wave (for example the crest) travels at the phase velocity. (Recall that phase velocity and group velocity are different).

The two polarization modes of a PM fiber have different effective indices of refraction. Thus, they have different propagation constants within the fiber and have different peak reflection wavelengths. Because the electric fields in the two polarization modes have different wavelengths, the same reflector causes the two electric fields to reflect at different light frequencies.

U.S. patent application Ser. No. 11/371,229 describes a way to compute birefringence of a segment of a waveguide at a particular waveguide location by computing the autocorrelation of reflection spectrum associated with a particular location along the waveguide. To perform that calculation, an apparatus measures a complex response of a spectral reflection of the waveguide at a delay corresponding to the particular location along the waveguide. An autocorrelation function is determined, and the birefringence is then calculated based on the distance between side and main autocorrelation peaks.

A limitation of the two approaches described above is the difficulty in distinguishing between two or more physical characteristics or parameters, e.g., strain and temperature, affecting an optical fiber. The ability to distinguish between characteristics like strain and temperature in fiber-optic sensing systems is important to the large-scale success of a fiber sensing technique. In addition, it would be desirable to specifically identify a strain of a particular segment of optical fiber as well as a temperature of that fiber segment. Technology described in this application overcomes this limitation and meets these desirable objectives.

A method and an apparatus are described for analyzing a portion of a polarization maintaining (PM) optical fiber having two polarization states. First and second spectral responses of the PM fiber portion are determined. The second spectral response is determined after a change in one or both of first and second physical characteristics affecting the fiber portion. The first and second spectral responses may be scatter patterns of the PM fiber portion, such as Rayleigh scatter patterns. In a preferred, but non-limiting, example implementation, the spectral responses are determined using Optical Frequency Domain Reflectometry (OFDR). Each polarization state of the PM fiber portion has a corresponding spectral component in the first spectral response. First and second spectral analyses of the PM fiber portion are performed using the first and second spectral responses. Based on those spectral analyses of the PM fiber portion, a first physical characteristic affecting the PM fiber portion is determined that is distinct from a second different physical characteristic affecting the fiber portion. The first and second physical characteristics are typically distributed along the PM fiber and the PM fiber portion is located any where along the PM fiber. Non-limiting example physical characteristics include temperature and strain. An output signal related to the first physical characteristics affecting the fiber portion is provided, e.g., for display, further processing, etc.

In one non-limiting example implementation, the first spectral analysis of the PM fiber portion includes calculating an autocorrelation of the first spectral response and an autocorrelation of the second spectral response, and the second spectral analysis of the PM fiber portion includes calculating a cross-correlation of the first spectral response and the second spectral response. A first autocorrelation peak offset is determined between a central autocorrelation peak and a side autocorrelation peak of the calculated autocorrelation of the first spectral response. A second autocorrelation peak offset is determined between a central autocorrelation peak and a side autocorrelation peak of the calculated autocorrelation of the second spectral response. A difference is then calculated between the first and second autocorrelation peak offsets. Two linear equations are constructed to calculate the first physical characteristic and the second physical characteristic using a matrix of proportionality constants and a vector including the difference between the first and second autocorrelation peak offsets and the cross-correlation of the first spectral response and the second spectral response.

The proportionality constants may, for example, be determined empirically as follows. The PM fiber portion is subjected to a known value of the first physical characteristic with a constant value of the second physical characteristic. A spectral shift is determined to generate a first proportionality constant. An autocorrelation shift is determined to generate a second proportionality constant. The PM fiber portion is subjected to a known value of the second physical characteristic with a constant value of the first physical characteristic. A spectral shift is determined to generate a third proportionality constant, and an autocorrelation shift is determined to generate a fourth proportionality constant.

An advantageous, non-limiting example application of this technology is discriminating and detecting temperature and strain changes affecting a portion of PM fiber. First scatter data of the portion of the PM fiber is determined for first values of temperature and strain. Second scatter data of the portion of the PM fiber is determined for second values of temperature and strain. Preferably, Optical Frequency Domain Reflectometry (OFDR) is used to obtain the scatter pattern data. At least one of the temperature values or the strain values is different between the first and second sets. The first and second scatter data are then used to discriminate between strain and temperature at the portion of the PM fiber and to determine a change in strain or a change in temperature at the portion of the PM fiber. A signal is provided based on the determination of the change in strain or the change in temperature at the portion of the PM fiber. As one example how to use the scatter data, the first and second scatter data are both autocorrelated and cross-correlated. Results from the autocorrelating and the cross-correlating are used to do the discriminating and determining of both a change in strain and a change in temperature at the portion of the PM fiber.

DETAILED DESCRIPTION

The following description sets forth specific details, such as particular embodiments, procedures, techniques, etc. for purposes of explanation and not limitation. But it will be appreciated by one skilled in the art that other embodiments may be employed apart from these specific details. Although PM optical fiber is used in the following description, this technology may be applied to any waveguide or optical device with a significant birefringence. In some instances, detailed descriptions of well known methods, interfaces, circuits, and device are omitted so as not obscure the description with unnecessary detail. Moreover, individual blocks are shown in some of the figures. Those skilled in the art will appreciate that the functions of those blocks may be implemented using individual hardware circuits, using software programs and data, in conjunction with a suitably programmed digital microprocessor or general purpose computer, using application specific integrated circuitry (ASIC), and/or using one or more digital signal processors (DSPs).

A scatter approach to analyzing distributed optical PM fiber relies on two assumptions confirmed by empirical observation. The first assumption is that, although the scatter is random along the length of the PM fiber, it is fixed in time, so that repeated measurements of the same fiber yield the same scattering profile. Changes in physical parameters or characteristics, such as temperature and strain, applied to the fiber only scale this scatter pattern as the fiber lengthens or shortens. The second assumption is that the two polarization states propagating in the PM fiber scatter off of the same pattern because the two modes occupy the same physical space in the fiber.

While the two polarization modes scatter off of the same fixed random pattern, they do so with a different wavelength due to the polarization-dependent refractive index of the fiber. Therefore, the spectra of the scattered light from the two polarization modes are shifted with respect to one another. Optical instrumentation, (e.g., an OFDR or OLDR instrument), used to measure the spectrum of the scatter can detect the sum of the two spectra from the polarization modes. Even though the spectrum of a segment or portion of the PM fiber is random, the spectral shift between the two modes can be detected by calculating the autocorrelation of the spectrum.

Figure 4:
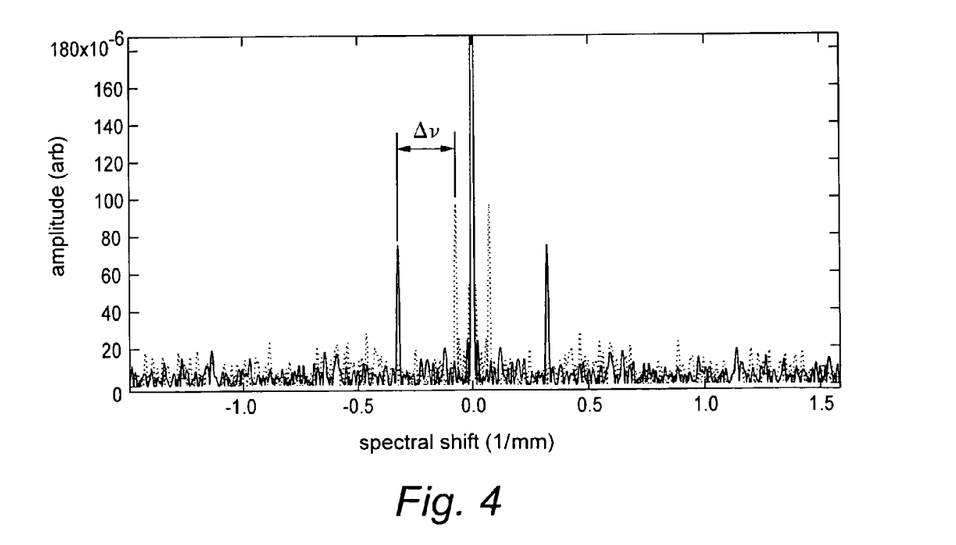
FIG. 4 illustrates an autocorrelation spectral shift $\Delta v_{auto}$.

An autocorrelation (AC) of the spectrum of a section of PM fiber is shown in FIG. 4. This plot shows a pair of peaks a certain distance from the central peak. The central peak is the zero-shift peak typical of an autocorrelation result. The side peaks (shown as solid lines) result from the presence of the shifted copy of the scatter pattern. The distance of the peaks from the central peak can be measured using any suitable peak detection algorithm, and that distance gives the amount of spectral shift between the two modes. Because the refractive index difference between the two modes of the PM fiber is temperature dependent, if the fiber portion is heated, these peaks shift closer to zero as shown in FIG. 4 as the dotted line peaks. Conversely, if the fiber is stretched, (put under strain), these side AC peaks will move farther from zero (not shown). The change in or distance between the side autocorrelation peaks is labeled as $\Delta v_{auto}$ and may also be measured using any suitable peak detection algorithm to find the peak location. A sinc interpolation may be used to achieve higher resolution with the index of the maximum value used as the peak value.

The autocorrelation of a spectral response measured using, e.g., OFDR, of a segment of PM fiber can be performed in any suitable way. One non-limiting example autocorrelation procedure is described in U.S. patent application Ser. No. 11/371,229, filed on Mar. 9, 2006, referred above and incorporated by reference. The reflected light intensity response of a PM fiber is measured using an OFDR or other swept laser system. For each fiber segment, the tunable laser 20 is swept through a range of frequencies/wavelengths, and corresponding light intensity signals as a function of frequency/wavelength are obtained for both the s and p polarization modes of the PM fiber. The light intensity at a particular frequency/wavelength is sometimes called a fringe. The light intensity signal is converted into an electrical time varying signal.

The measured light intensities for the s and p polarization modes are preferably linearized using reference interferometer data. The linearized s and p light intensity data are then Fourier-transformed into an array of complex data in the frequency domain that defines a scatter pattern for that fiber segment. The scatter pattern is preferably stored in memory for subsequent operations. The s and p complex data relating to a specific segment at a particular location along the fiber are extracted from the array. The extracted s and p data are Fourier transformed into the frequency domain, and the amplitude of the complex number at each point in the each of the s and p arrays is calculated. The vector sum of the two s and p amplitude arrays is calculated to form a single amplitude spectrum. The mean amplitude introduces an offset to the later calculated autocorrelation. If the data set is finite, (and it usually is), the mean of the signals produces a triangularly-shaped bias or offset on the resulting correlation. This bias adds no information, and makes it more difficult to easily discern the peak marking where the two lists match. The mean of the spectrum is therefore preferably removed. The autocorrelation of the amplitude spectrum is then determined resulting in a main autocorrelation peak and two side autocorrelation peaks for the s and p polarization modes.

If the spectrum of scatter from the PM fiber portion is cross-correlated with a previously-determined reference scatter spectrum, a different cross-correlation peak shift is detected. This cross-correlation peak shift is proportional to both temperature and strain, but proportionality coefficients for the cross-correlation, relating temperature and strain to peak shift, are different than proportionality coefficients for the autocorrelation peak shift. When a fiber is stretched, the internal scatter pattern is elongated. As a result, its spectrum shifts to longer wavelengths, (i.e., the wavelengths are stretched), and a strain proportionality coefficient indicates how much the spectrum is shifted for a given amount of stretch, (i.e., strain). When the fiber is heated, the glass expands, the scatter pattern is again elongated, and the spectrum shifted to longer wavelengths. The temperature proportionality coefficient indicates how much the spectrum shifts for a given temperature.

The reason the strain and temperature proportionality coefficients are different can be understood by observing the different effects that temperature and strain have on the autocorrelation spectral shift. The autocorrelation peaks indicate how the two different polarizations are propagating. The splitting in the spectral response between the two polarizations is caused by two stress rods placed near the fiber core. These stress rods have a different coefficient of thermal expansion than the surrounding glass. When the fiber perform is melted, the strain across the cross section of fiber is zero. But as the fiber cools, the stress rods contract at a different rate than the surrounding glass, and stresses are built up. These stresses split the spectral responses of the two polarizations. When the glass is heated, this spectral splitting is reduced since as the temperature is closer to the melted glass condition where there is no spectral split. When the glass is stretched, the cross sectional area contracts a small amount, and this slightly increases the spectral splitting.

Figure 5:
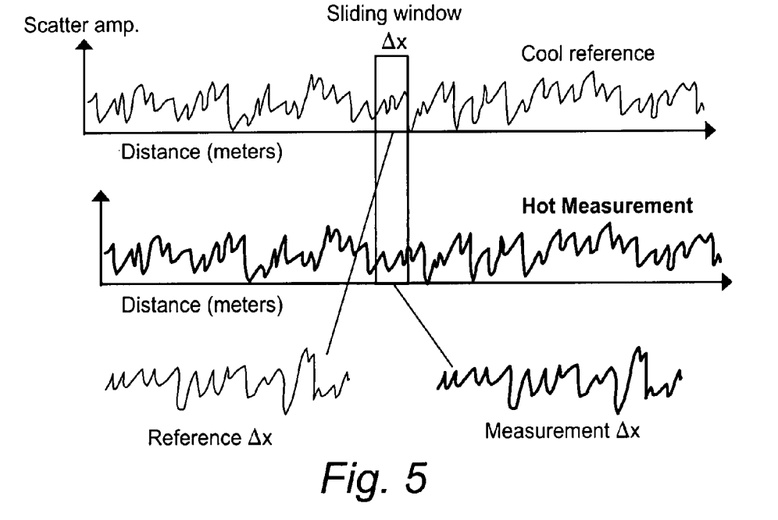
FIG. 5 illustrates conceptually extracting scatter pattern data for a portion of a PM fiber.
Figure 6:
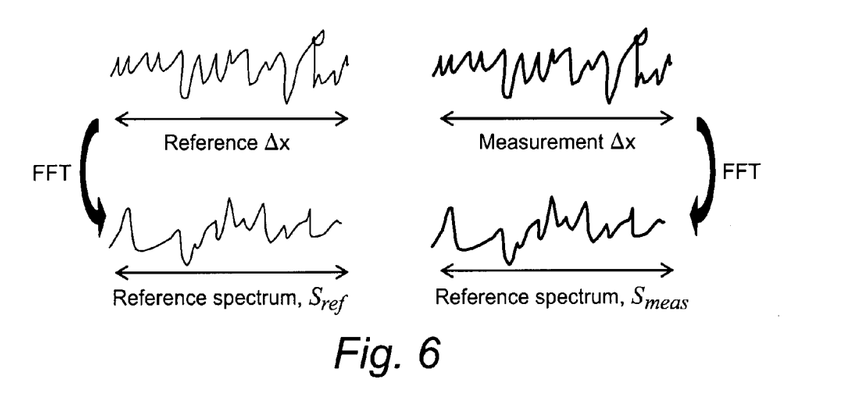
FIG. 6 illustrates conceptually transforming the scatter spectrums from FIG. 14.
Figure 7:
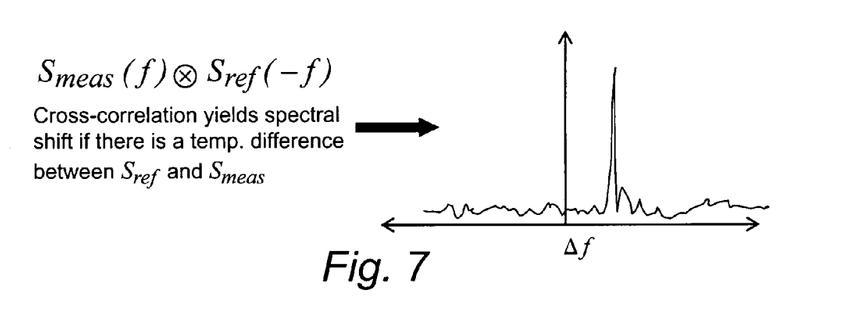
FIG. 7 illustrates conceptually that a cross-correlation results in a spectral shift if there is a temperature difference between the scatter spectrums from FIG. 14.

A conceptual illustration of a cross-correlation peak shift determination is provided in FIGS. 5-7. First, a reference (e.g., "cool") measurement of the fiber scatter is taken, which is followed by a sensing (e.g., "hot") measurement of the same fiber after some temperature change. A portion or segment $\Delta x$ (e.g., 2 cm) of complex scatter data as a function of distance is extracted from the reference and measurement data, where $\Delta x$ is shown as a sliding window in FIG. 5. FIG. 6 illustrates that the extracted reference and measurement scatter data are transformed into the spectral domain using a Fourier transform to generate a reference spectrum and a measurement spectrum. FIG. 7 illustrates conceptually a cross-correlation of these two spectra resulting in a cross-correlation peak shifted in frequency by $\Delta f$ from the center frequency.

Figure 8:
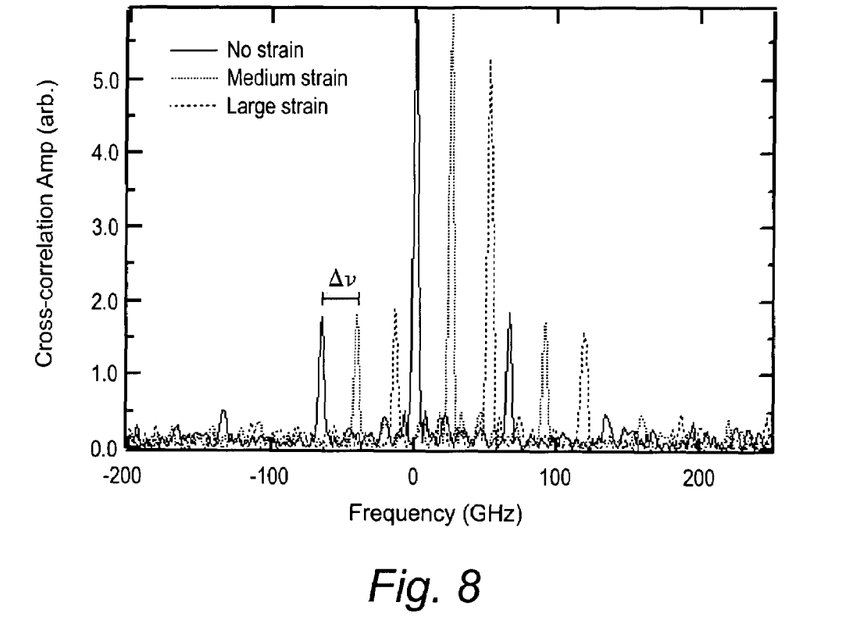
FIG. 8 illustrates an cross-correlation spectral shift $\Delta v_{cross}$.

The same principle applies to other physical characteristics that affect the PM fiber. For example, FIG. 8 shows three peaks resulting from three cross-correlations of a reference spectrum with three different measurement spectrums measured at different strains for a PM fiber portion. The increasing shift away from the central location. The change in or distance between cross-correlation peaks is labeled as $\Delta v_{cross}$, and as with the autocorrelation shift, can be determined by applying any suitable peak detect algorithm.

The cross-correlation of a spectral response measured using, e.g., OFDR, of a segment of PM fiber can be performed in any suitable way. One non-limiting example cross-correlation procedure is described in U.S. patent application Ser. No. 11/062,740, filed on Jan. 24, 2005, referred above and incorporated by reference. In that example, a complex representation of the two polarization responses in the time domain segment associated with the segment of fiber of interest (e.g., 1 cm of fiber located 25.3 meters away) is transformed into the frequency domain. The total amplitude spectrum is calculated using both polarization responses, and the mean value is subtracted so that the resulting set of amplitudes have an average value of zero. The auto correlation of is then calculated of this real-valued array.

After measuring the autocorrelation and cross-correlation shifts as a function of temperature and strain, a linear system may be constructed relating these parameters, $$\begin{bmatrix} \Delta v_{auto} \\ \Delta v_{cross} \end{bmatrix} = \begin{bmatrix} \chi_{Ta} & \chi_{Tc} \\ \chi_{\varepsilon a} & \chi_{\varepsilon c} \end{bmatrix} \begin{bmatrix} \Delta T \\ \Delta \varepsilon \end{bmatrix}$$

where $\Delta v_{auto}$ and $\Delta v_{cross}$ are the auto- and cross-correlation shifts, $\Delta T$ and $\Delta \varepsilon$ are the temperature change and strain change, respectively, and the matrix elements $\chi_{Ta}$, $\chi_{Tc}$, $\chi_{\varepsilon a}$, and $\chi_{\varepsilon c}$ represent the proportionality constants between these parameters. This matrix is invertible and allows calculation of strain and temperature from the measured autocorrelation and cross-correlation shifts.

$$\begin{bmatrix} \Delta T \\ \Delta \varepsilon \end{bmatrix} = \begin{bmatrix} \chi_{Ta} & \chi_{Tc} \\ \chi_{\varepsilon a} & \chi_{\varepsilon c} \end{bmatrix}^{-1} \begin{bmatrix} \Delta v_{auto} \\ \Delta v_{cross} \end{bmatrix}$$

$$= \frac{1}{\chi_{Ta}\chi_{\varepsilon c} - \chi_{\varepsilon a}\chi_{Tc}} \begin{bmatrix} \chi_{\varepsilon c} & -\chi_{Tc} \\ -\chi_{\varepsilon a} & \chi_{Ta} \end{bmatrix} \begin{bmatrix} \Delta v_{auto} \\ \Delta v_{cross} \end{bmatrix}$$

This linear system reduces to a set of equations readily solvable using a computer or other suitable data processing circuitry:

$$\Delta \varepsilon = \frac{\chi_{Ta} \Delta v_{cross} - \chi_{\varepsilon a} \Delta v_{auto}}{\chi_{Ta}\chi_{\varepsilon c} - \chi_{\varepsilon a}\chi_{Tc}}$$

-continued $$\Delta T = \frac{\chi_{\varepsilon c} \Delta v_{auto} - \chi_{Tc} \Delta v_{cross}}{\chi_{Ta}\chi_{\varepsilon c} - \chi_{\varepsilon a}\chi_{Tc}}$$

Figure 9:
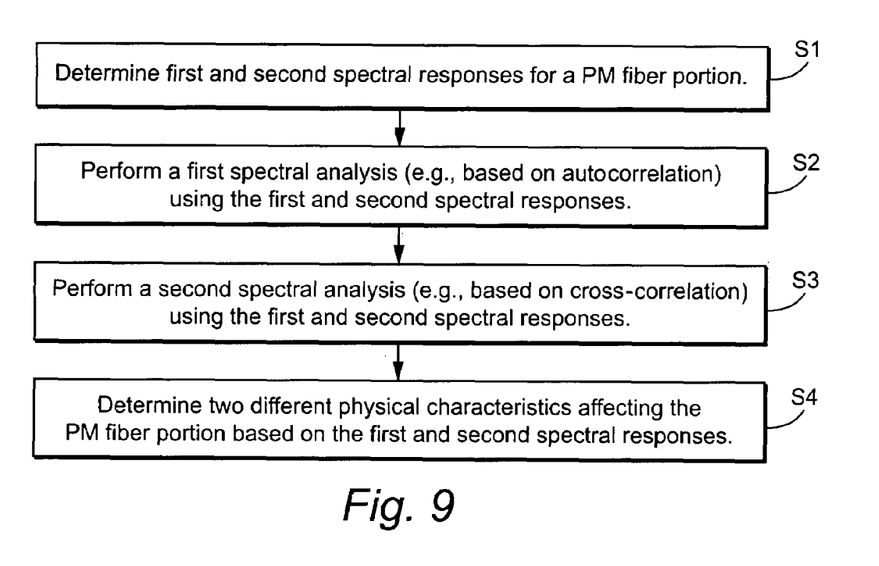
FIG. 9 is a flow chart illustrating example steps for determining two physical characteristics affecting a PM fiber segment based on analysis of spectral responses from the PM fiber segment.

FIG. 9 is a flowchart illustrating example steps for determining two physical characteristics affecting a PM fiber segment based on analysis of spectral responses from the PM fiber segment. First and second spectral responses are determined for a PM fiber portion (step S1). A first spectral analysis (e.g., based on autocorrelation) using the first and second spectral responses is performed (step S2). A second spectral analysis (e.g., based on cross-correlation) also using the first and second spectral responses is performed (step S3). Two different physical characteristics affecting the PM fiber portion may then be distinctly determined based on the first and second spectral analyses (step S4). These steps may be implemented using a computer or other suitable data processing circuitry.

Figure 10:
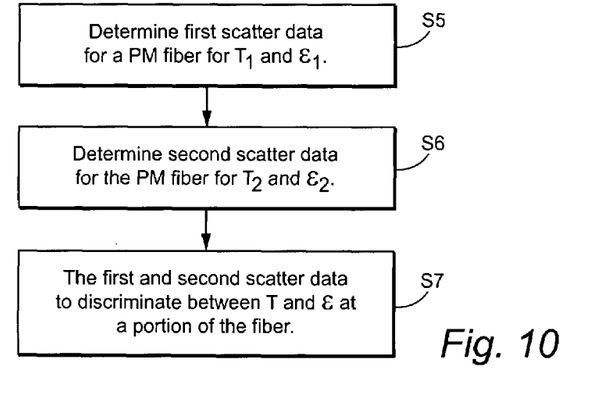
FIG. 10 is a flow chart illustrating example steps for using scatter data for a PM fiber segment to discriminate between temperature and strain at a portion of PM fiber.

FIG. 10 is a flowchart illustrating example steps using scatter data for a PM fiber segment to discriminate between temperature and strain at a portion of that PM fiber, where temperature and strain are two non-limiting examples of physical characteristics that affect the fiber. First scatter data is determined for the PM fiber portion for a first temperature $T_1$ and a first strain $\epsilon_1$ (step S5). Second scattered data are determined for the PM fiber portion for a second temperature $T_2$ and a second strain $\epsilon_2$ (step S6). The first and second scattered data are used to discriminate between and measure temperature and strain at that portion of the fiber (step S7). As with FIG. 9, the steps in FIG. 10 may be implemented using a computer or other suitable data processing circuitry.

Figure 11:
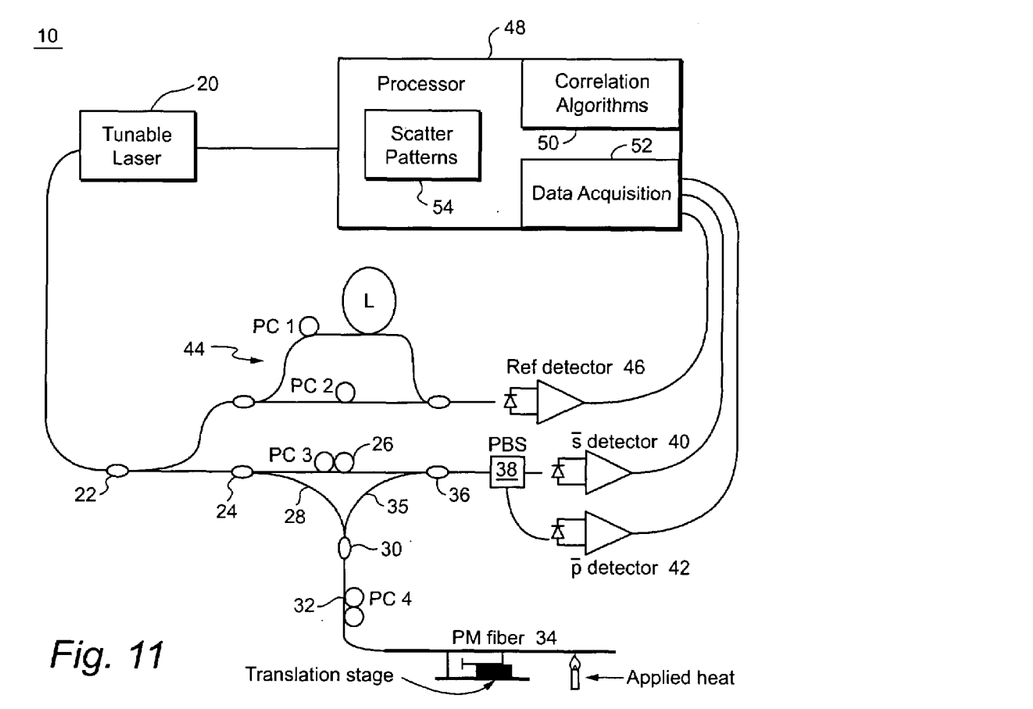
FIG. 11 is a diagram illustrating an OFDR system for measuring spectral responses of a PM fiber to determine changes in temperature and strain for a portion of PM fiber.

FIG. 11 shows an example OFDR-based system 10 analyzing a portion of an optimal PM fiber any where along the fiber based on scatter data. A tunable laser 20 is scanned through a range of frequencies or wavelengths. The laser light is preferably provided to splitter 22 which divides the laser light into two paths. The first desirable (but still optional) path is to a laser linearization interferometer 44 that includes a first longer path and a second shorter path with polarization controllers PC1 and PC2. These polarization controllers ensure that the light in the two different paths interferes. The light is combined and detected by an optical-to-electrical reference detector 46 and then provided to the processor/acquisition unit 44 in order to associate DUT optical intensity signals with a corresponding frequency/wavelength. One example laser linearization process is described in detail in U.S. Pat. No. 6,856,400, the contents of which are incorporated here by reference.

The second path from splitter 22 routes the laser light to splitter 24, which splits the light into a reference path including polarization controller PC3 26, which splits the reference light evenly between the s and p states, and a device under test (DUT) input path 28—in this case a PM fiber 34. The DUT input light is input to the DUT fiber 34 via a coupler 30 and polarization controller PC4 32. Polarization controller 32 is adjusted to ensure there is light in both the fast and slow polarization modes. The back-scattered light from the DUT 34 is passed via PC4, coupler 30, and fiber 35 for coherent combination with the reference path light at combiner 36. The combined reference and DUT fiber back scatter signal is divided into the s and p polarizations by the polarization beam splitter (PBS) 38. The two backscatter polarization signals are detected at respective s and p optical-to-electrical detectors 40 and 42 and provided to the data acquisition unit 52 of processor 48 for processing.

The processing unit 44 includes a memory 50 that contains one or more algorithms for implementing equations set forth above and the procedures in the flowcharts described in this application. Detected optical signals are processed to produce a "scatter pattern" for individual fiber segments or other optical components. One example scatter pattern is a Rayleigh scatter pattern. One or more scatter patterns used for autocorrelations and cross-correlations may be stored in the scatter pattern memory 54.

Figure 12:
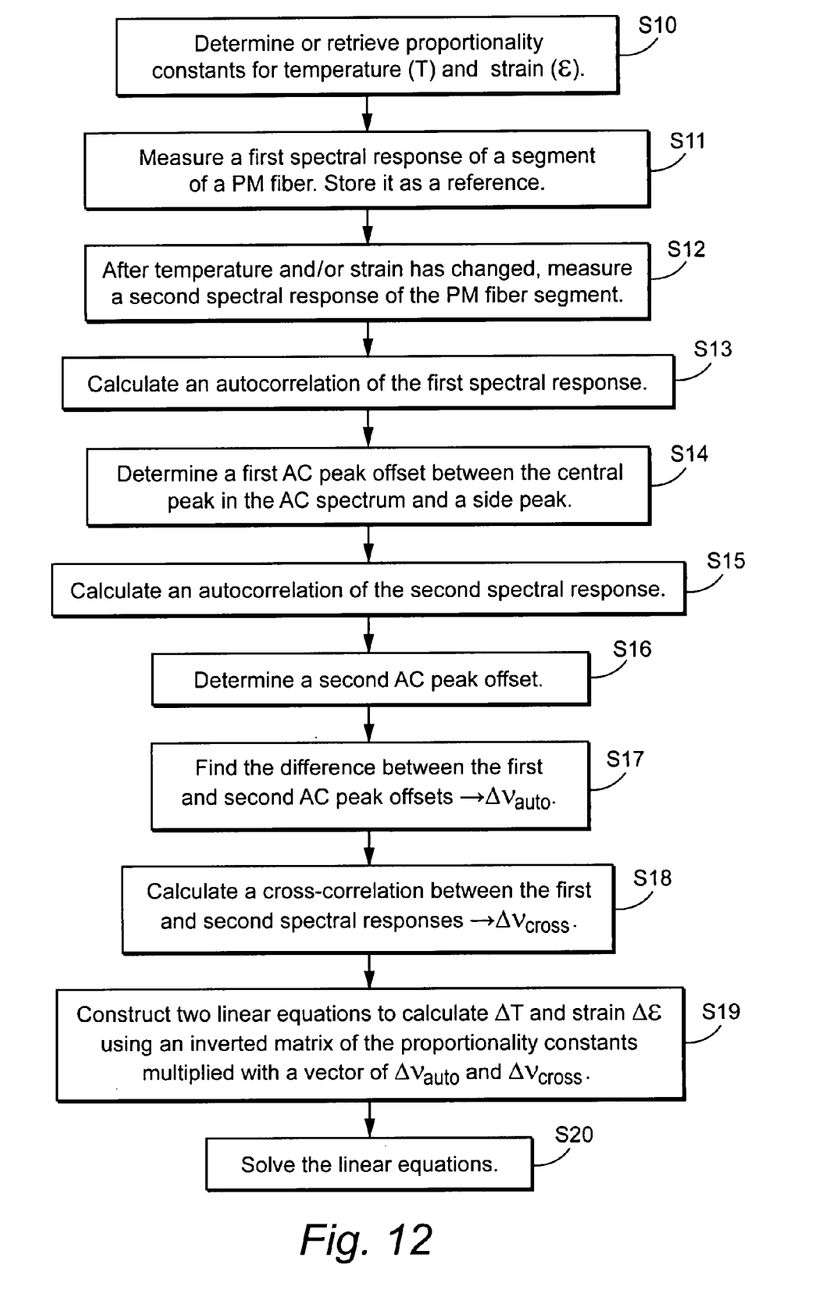
FIG. 12 is a flow chart illustrating steps for one example way to use scatter data for a PM fiber segment to determine temperature and strain at a portion of PM fiber.

FIG. 12 is a flowchart illustrating steps for one non-limiting example way to use scattered data for a PM fiber segment to determine temperature and strain at a portion of PM fiber. Proportionality contents are determined or retrieved from memory for temperature (T) and strain ($\epsilon$) (step S10). A first spectral response is measured of a segment of a PM fiber and stored as a reference (step S11). After temperature and/or strain change, a second spectral response of the PM fiber segment is measured (step S12). An autocorrelation of the first spectral response may then be calculated (step 13). A first autocorrelation peak offset is determined between the central peak in the autocorrelation spectrum and a side autocorrelation peak (step S14). An autocorrelation of the second spectral response is calculated (step S15), and a second autocorrelation peak offset is determined (step S16). The difference between the first and second autocorrelation peak offsets is determined (step S17). A cross-correlation between the first and second spectral responses is also calculated (step S18). Two linear equations are then constructed calculate $\Delta T$ and $\Delta \epsilon$ using an inverted matrix of the proportionality contents multiplied with a vector comprised of $\Delta v_{auto}$ and $\Delta v_{cross}$ (step S19). The linear equations are then solved to calculate $\Delta T$ to determine the change in temperature and $\Delta \epsilon$ to determine the change in strain (step S20). These steps may be implemented using a computer or other suitable data processing circuitry.

Figure 13:
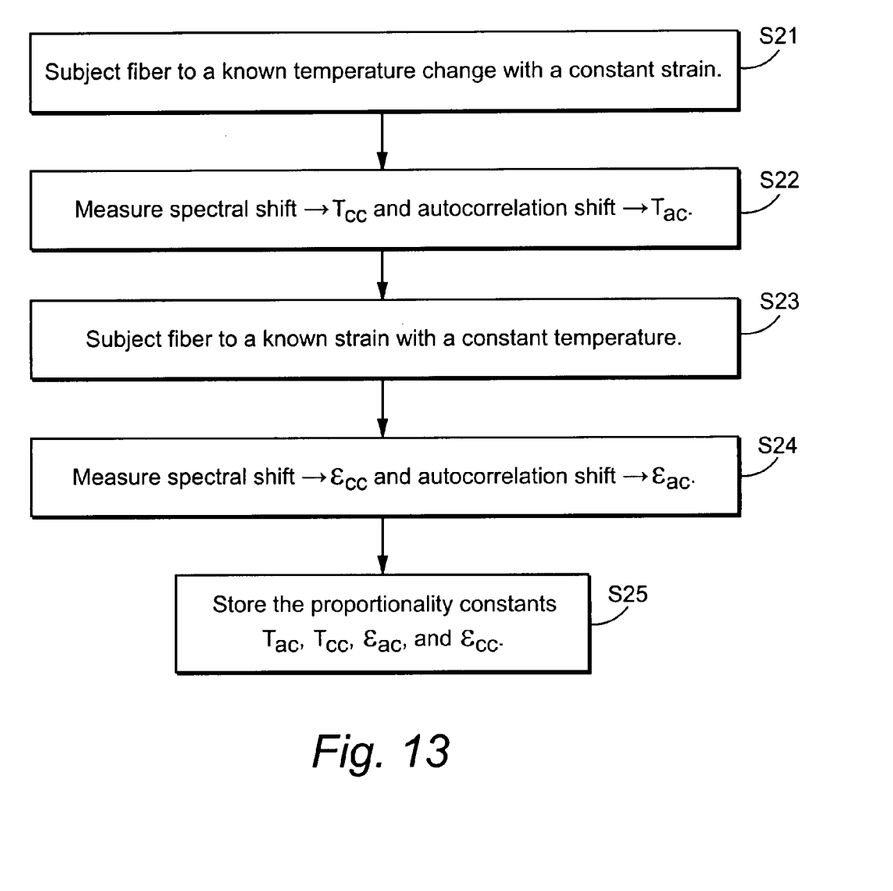
FIG. 13 is a flow chart illustrating steps for one example way to determine proportionality constants used in FIG. 12.

FIG. 13 is a flowchart illustrating steps for one example way to determine proportionality contents used in the procedures outlined for FIG. 12. The fiber is subjected to a known temperature change at a constant strain (step S21). The spectral shift for the cross-correlation is then measured to generated proportionality constant $T_{cc}$ and the autocorrelation shift is measured to determine the proportionality contents $T_{ac}$ (step S22). The fiber is subjected to a known strain with a constant temperature (step S23). The spectral shift for the cross-correlation is then measured to determine the cross-correlation proportionality constant $\epsilon_{cc}$ and the autocorrelation shift is measured to determine the autocorrelation proportionality constant $\epsilon_{ac}$ (step 24). The proportionality contents $T_{ac}$, $T_{cc}$, $E_{ac}$, and $E_{cc}$ are stored for future processing (step S25).

Figure 14:
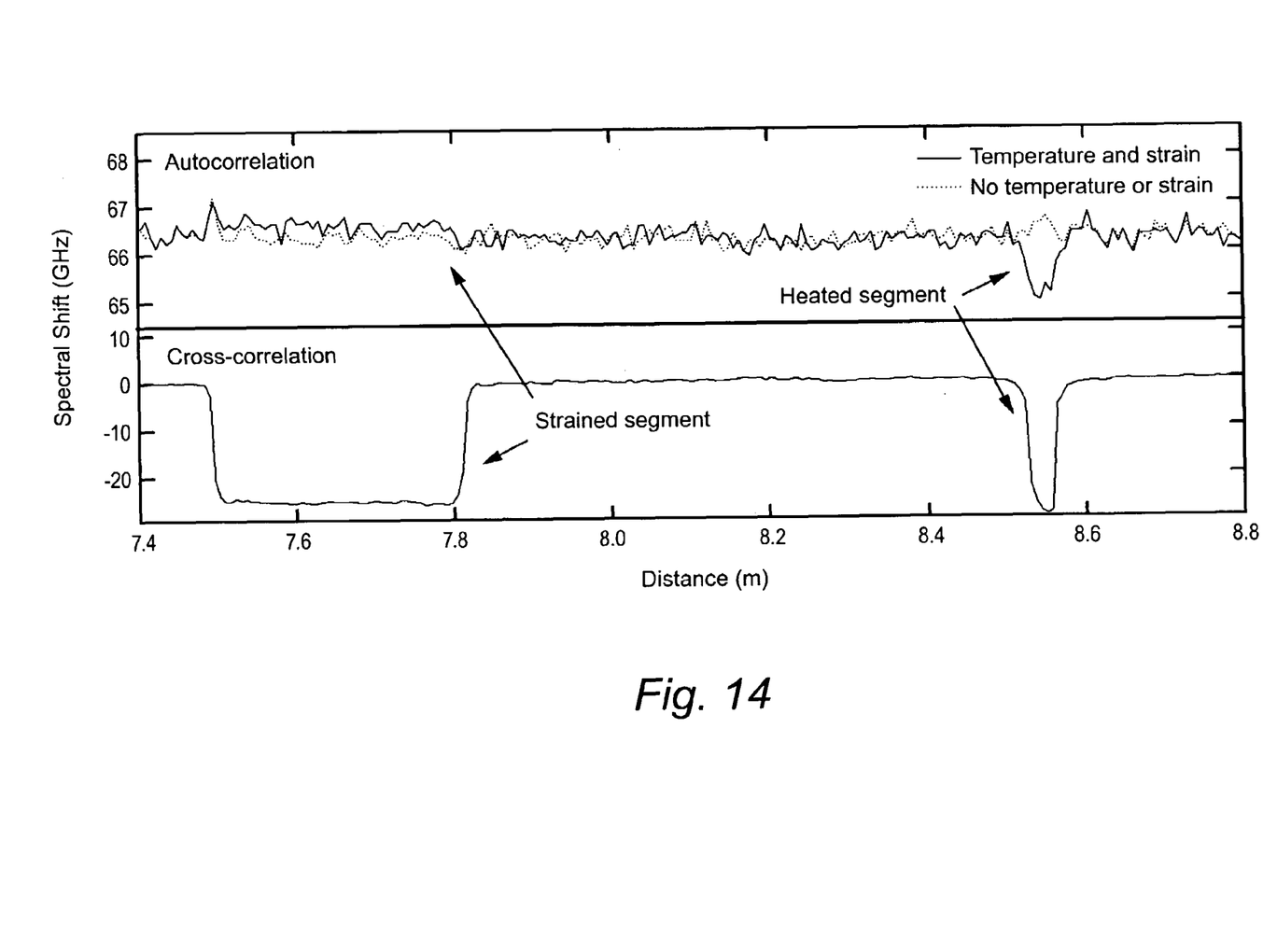
FIG. 14 is a graph of autocorrelation and cross-correlation spectral shifts against distance along a PM fiber.

A portion of the PM fiber under test conditions was strained using a translation stage (shown in FIG. 11) and a nearby portion was heated (shown as a candle in FIG. 11). A reference measurement of the fiber scatter was first recorded with no strain level change and no temperature change. A section of the fiber was then heated and a measurement was taken at three different strain levels. If only cross-correlation data is used to determine a spectral shift, one obtains the results shown in the bottom graph of FIG. 14, where both strain and temperature appear as spectral shifts, but with no means of discriminating between the two. Measuring only the autocorrelation shift yields the data shown in the top graph of FIG. 14. In this test, the autocorrelation shift due to strain is relatively weak and opposite to that calculated using cross-correlations. But when both autocorrelation and cross-correlation are performed as described above, two physical parameter affects can be distinguished and separately measured as illustrated in FIGS. 15 and 16.

Figure 15:
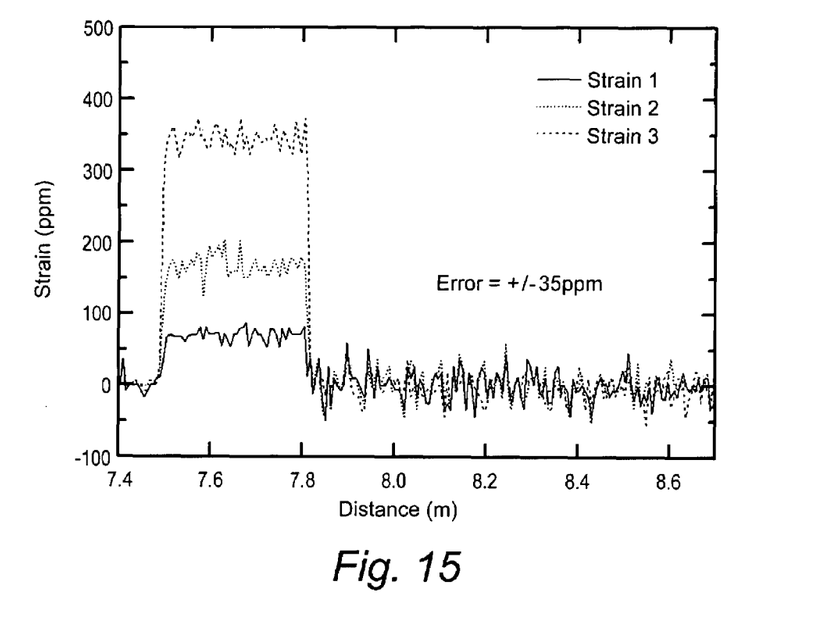
FIG. 15 is a graph of strain versus distance along a PM fiber for increasing strain.
Figure 16:
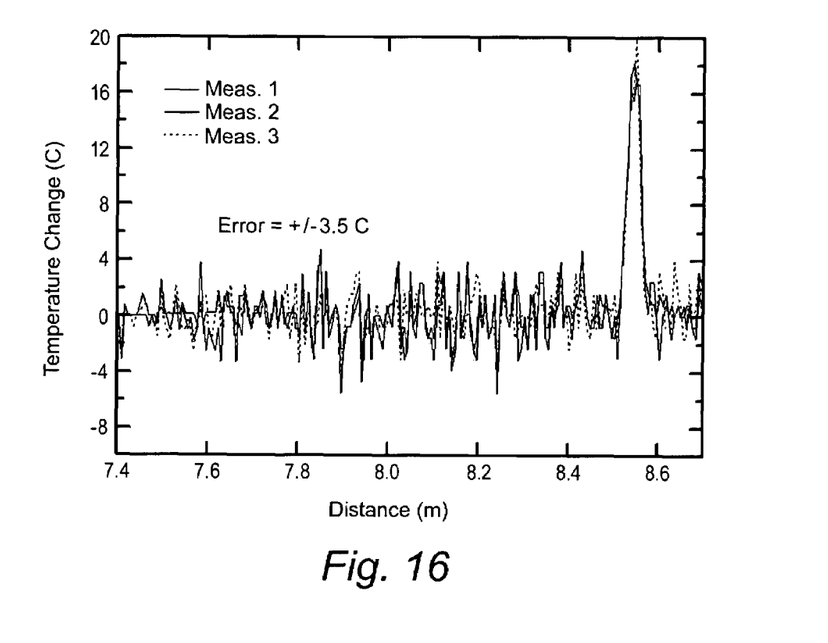
FIG. 16 is a graph of temperature versus distance along a PM fiber.

FIG. 15 shows the measured strain for three OFDR scans taken at three increasing strain levels. There is no sign of the temperature change at 8.55 m. FIG. 16 shows the measured temperature for each of these three scans in which the temperature remained constant. Again, the temperature change is distinct from the strain demonstrating successful temperature/strain discrimination. In addition, the actual strain change and temperature change values can be determined. For the data sets shown, the spatial resolution of the measurement was 2 cm. The error in the temperature and strain data was estimated to be 3.5 C and 35 ppm, respectively.

Figure 17:
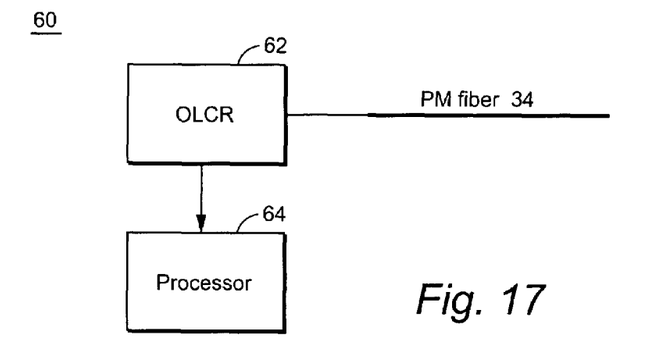
FIG. 17 illustrates an example OLCR-based apparatus for determining spectral responses of a PM fiber.

FIG. 17 shows another non-limiting example embodiment 60 using an OLCR 62 coupled to a processor 62. In Optical Low Coherence Reflectometry, a broadband source is used, and the reference delay in the optics is varied. When the reference delay and the delay to the DUT match to within the coherence length of the source (which is short) interference occurs. For more details regarding OLCR, see, for example, H. G. Limberger, P. Y. Fonjallaz, P. Lambelet, and R. P. Salathe, "OLCR Characterization of Efficient Bragg Gratings in Optical Fiber," SPIE, Vol 2044, pp 272-283

Because PM fiber establishes two well-defined propagation states in the fiber that do not readily transfer power, (thus the polarization maintaining aspect of the fiber), polarization diversity detection, as performed by the PBS and the s and p detectors shown in FIG. 11, is not a necessity. If light is launched at 45 degrees to the birefringenent axis in the fiber, then similar levels of light will propagate in each mode of the fiber. Because the modes do not couple, there will be no polarization fading in the reflected light. The polarization of the reference light can then be adjusted to also be 45 degrees. The measured interference signal will then contain information from both propagating states, and will not display polarization fading. This is important because the polarization beam splitter is an expensive item as well as a potential source of stray reflections in the optical network. Further, an entire data channel is eliminated, reducing cost, improving speed, and allowing more efficient multi-channel operation.

Figure 18:
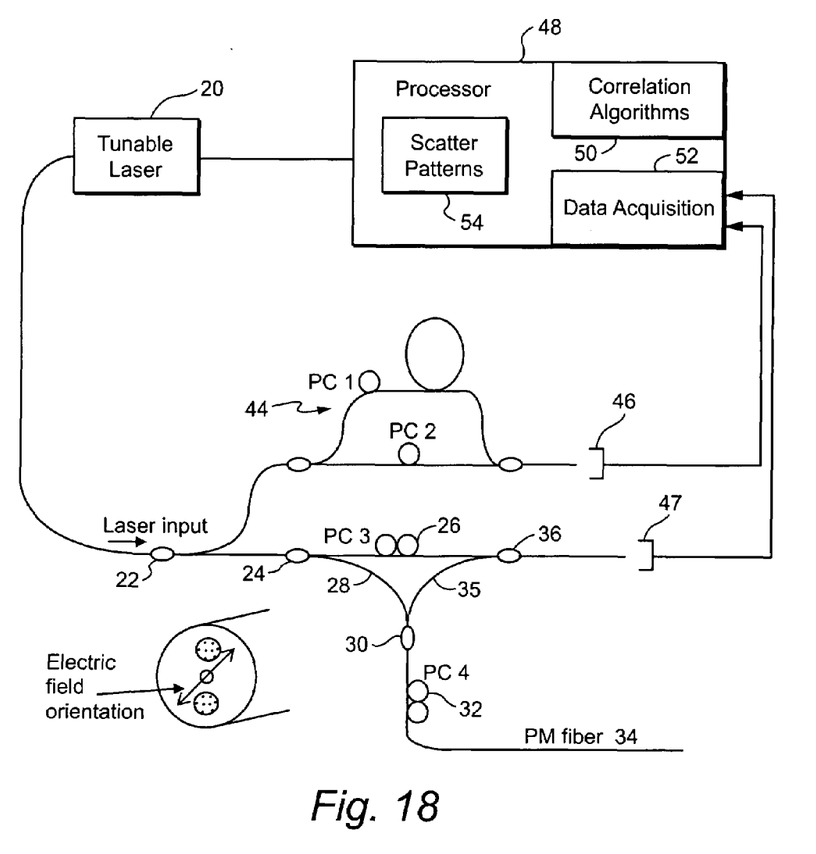
FIG. 18 illustrates an example OFDR-based apparatus that does not require a polarization beam splitter and both s and p detectors.

A non-limiting example of an OFDR network suitable for analyzing PM fiber without a polarization beam-splitter or two s and p detectors is shown in FIG. 18. Instead of using a polarization beam-splitter, light is launched at 45 degrees to the birefringent axis in the fiber, corresponding to the axis intersecting the two stress rods using PC 4. As a result, similar levels of light will propagate in each mode of the fiber. Rotating the two paddles of the polarization controller PC 4 until the side peaks are maximized ensures that a substantial portion (e.g., more than 10%) of the optical power is launched in each of the two polarization modes of the PM fiber. The polarization controller PC 3 is adjusted (paddles are rotated) to set the polarization state of the reference field such that it is not orthogonal to either polarization mode of the PM fiber (i.e., both states are detected) and the side peaks are maximized. The adjustments to PC4 are repeated until the side-peak height is satisfactory.

The reflected light can be detected using only one light intensity detector 47. In this non-limiting example embodiment, no vector sum is required. The processing otherwise is the same as described above. A segment of complex numbers associated with the location of interest is extracted, transformed back to the frequency domain, its amplitude determined, and an autocorrelation performed.

The present technology permits distributed measurement of different physical characteristics in standard, PM fiber using commercially-available, fiber optic instrumentation such as OFDR and OLCR. Processing of the scatter data allows clear discrimination between different physical characteristics. As demonstrated above, the scatter inherent in the PM fiber allows commercially-produced, standard PM fiber to be used as a temperature and/or strain discriminating sensor. Since it is often desirable to use different fiber coatings (acrylated, polyamide, gold, carbon, etc.) in different applications, and since producing gratings in fiber often damages or removes the coatings, being able to use unaltered fiber permits the use of the sensing technique in any application where the required coating can be obtained. OFDR permits long lengths (e.g., >100 m) of optical fiber to be used as a sensor array at high resolutions (e.g., <1 cm), and the use of the inherent scatter allows any arbitrary location in the fiber to be used as a sensor. Finally, the discrimination between temperature and strain allows the sensors to be used in applications where fiber is installed in such a way that strain and/or temperature changes in the fiber cannot be prevented.

Although various example embodiments have been shown and described in detail, the claims are not limited to any particular embodiment or example. None of the above description should be read as implying that any particular element, step, range, or function is essential such that it must be included in the claims scope. Reference to an element in the singular is not intended to mean "one and only one" unless explicitly so stated, but rather "one or more." The scope of patented subject matter is defined only by the claims. The extent of legal protection is defined by the words recited in the allowed claims and their equivalents. All structural and functional equivalents to the elements of the above-described example embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC § 112 unless the words "means for" or "step for" are used. Furthermore, no feature, component, or step in the present disclosure is intended to be dedicated to the public regardless of whether the feature, component, or step is explicitly recited in the claims.

The invention claimed is:

1. A method for analyzing a portion of a polarization maintaining (PM) optical fiber having two polarization states, comprising:
   determining a first spectral response of the PM fiber portion, where each polarization state of the PM fiber portion has a corresponding spectral component in the first spectral response;
   determining a second spectral response of the PM fiber portion, where each polarization state of the PM fiber portion has a corresponding spectral component in the second spectral response;
   performing a first spectral analysis of the PM fiber portion using the first and second spectral responses;
   performing a second spectral analysis of the PM fiber portion using the first and second spectral responses;
   based on the first and second spectral analyses of the PM fiber portion, determining a first physical characteristic affecting the PM fiber portion distinct from a second different physical characteristic affecting the fiber portion; and
   providing an output signal related to the first physical characteristic affecting the fiber portion.

2. The method in claim 1, wherein the spectral responses are determined using Optical Frequency Domain Reflectometry (OFDR).

3. The method in claim 2, wherein the first and second physical characteristics are strain and temperature.

4. The method in claim 2, wherein the first and second physical characteristics are distributed along the PM fiber and the PM fiber portion is located any where along the PM fiber.

5. The method in claim 2, wherein the second spectral response is determined after a change in one or both of first and second physical characteristics affecting the fiber portion.

6. The method in claim 5, wherein the scatter patterns are Rayleigh scatter patterns.

7. The method in claim 2, wherein the first and second spectral responses are scatter patterns of the PM fiber portion.

8. The method in claim 2, wherein the first spectral analysis of the PM fiber portion includes calculating an autocorrelation of the first spectral response and an autocorrelation of the second spectral response, and
wherein the second spectral analysis of the PM fiber portion includes calculating a cross-correlation of the first spectral response and the second spectral response.

9. The method in claim 8, further comprising:
determining a first autocorrelation peak offset between a central autocorrelation peak and a side autocorrelation peak of the calculated autocorrelation of the first spectral response;
determining a second autocorrelation peak offset between a central autocorrelation peak and a side autocorrelation peak of the calculated autocorrelation of the second spectral response;
calculating a difference between the first and second autocorrelation peak offsets.

10. The method in claim 9, further comprising:
constructing two linear equations to calculate the first physical characteristic and the second physical characteristic using a matrix of proportionality constants and a vector including the difference between the first and second autocorrelation peak offsets and the cross-correlation of the first spectral response and the second spectral response.

11. The method in claim 10, wherein the proportionality constants are determined in accordance with the following:
subjecting the PM fiber portion to a known value of the first physical characteristic with a constant value of the second physical characteristic;
determining a spectral shift to generate a first proportionality constant;
determining an autocorrelation shift to generate a second proportionality constant;
subjecting the PM fiber portion to a known value of the second physical characteristic with a constant value of the first physical characteristic;
determining a spectral shift to generate a third proportionality constant; and
determining an autocorrelation shift to generate a fourth proportionality constant.

12. The method in claim 1, further comprising: based on the first and second spectral analyses of the PM fiber portion, determining the second physical characteristic affecting the PM fiber portion and providing an output signal related to the second physical characteristic affecting the fiber portion.

13. A method for analyzing a portion of a polarization maintaining (PM) optical fiber having two polarization states, comprising:
determining first scatter data of the portion of the PM fiber for first values of temperature and strain;
determining second scatter data of the portion of the PM fiber for second values of temperature and strain, where at least one of the temperature values or the strain values is different between the first and second sets;
using the first and second scatter data to discriminate between strain and temperature at the portion of the PM fiber and to determine a change in strain or a change in temperature at the portion of the PM fiber; and
providing a signal based on the determination of the change in strain or the change in temperature at the portion of the PM fiber.

14. The method in claim 13, further comprising:
using Optical Frequency Domain Reflectometry (OFDR) to obtain the scatter data.

15. The method in claim 14, wherein the using step includes:
autocorrelating the first and second scatter data;
cross-correlating the first and second scatter data; and
using results from the autocorrelating and the cross-correlating to discriminate between strain and temperature at the portion of the PM fiber and to determine a change in strain or a change in temperature at the portion of the PM fiber.

16. The method in claim 14, wherein the strain and temperature vary at different locations along the PM fiber and the PM fiber portion is located any where along the PM fiber.

17. The method in claim 14, wherein the scatter patterns are Rayleigh scatter patterns.

18. Apparatus for analyzing a portion of a polarization maintaining (PM) optical fiber having two polarization states, comprising:
optical processing circuitry configured to optically scan a portion of the PM optical fiber over a range of wavelengths to acquire a first light intensity signal and to later optically scan the PM optical fiber to acquire a second light intensity signal; and
data processing circuitry configured to:
determine a first spectral response of the PM fiber portion based on the first light intensity signal, where each polarization state of the PM fiber portion has a corresponding spectral component in the first spectral response;
determine a second spectral response of the PM fiber portion based on the second light intensity signal, where each polarization state of the PM fiber portion has a corresponding spectral component in the second spectral response;
perform a first spectral analysis of the PM fiber portion using the first and second spectral responses;
perform a second spectral analysis of the PM fiber portion using the first and second spectral responses;
based on the first and second spectral analyses of the PM fiber portion, determine a first physical characteristic affecting the PM fiber portion distinct from a second different physical characteristic affecting the fiber portion; and
provide an output signal related to the first physical characteristic affecting the fiber portion.

19. The apparatus in claim 18, wherein the optical processing circuitry is configured to use Optical Frequency Domain Reflectometry (OFDR).

20. The apparatus in claim 19, wherein the electronic circuitry is configured, based on the first and second spectral analyses of the PM fiber portion, to determine the second physical characteristic affecting the PM fiber portion and providing an output signal related to the second physical characteristic affecting the fiber portion.

21. The apparatus in claim 19, wherein the first and second physical characteristics are strain and temperature.

22. The apparatus in claim 19, wherein the first and second physical characteristics are distributed along the PM fiber and the PM fiber portion is located any where along the PM fiber.

23. The apparatus in claim 19, wherein the electronic circuitry is configured to determine the second spectral response after a change in one or both of first and second physical characteristics affecting the fiber portion.

24. The apparatus in claim 19, wherein the first and second spectral responses are scatter patterns of the PM fiber portion.

25. The apparatus in claim 24, wherein the scatter patterns are Rayleigh scatter patterns.

26. The apparatus in claim 19, wherein the first spectral analysis of the PM fiber portion includes a calculation of an autocorrelation of the first spectral response and an autocorrelation of the second spectral response, and wherein the second spectral analysis of the PM fiber portion includes a calculation a cross-correlation of the first spectral response and the second spectral response.

27. The apparatus in claim 26, wherein the electronic circuitry is configured to:

determine a first autocorrelation peak offset between a central autocorrelation peak and a side autocorrelation peak of the calculated autocorrelation of the first spectral response;

determine a second autocorrelation peak offset between a central autocorrelation peak and a side autocorrelation peak of the calculated autocorrelation of the second spectral response;

calculate a difference between the first and second autocorrelation peak offsets.

28. The apparatus in claim 27, wherein the electronic circuitry is configured to:

construct two linear equations to calculate the first physical characteristic and the second physical characteristic using a matrix of proportionality constants and a vector including the difference between the first and second autocorrelation peak offsets and the cross-correlation of the first spectral response and the second spectral response.

29. The apparatus in claim 28, wherein the electronic circuitry is configured to determine the proportionality constants in accordance with the following:

subject the PM fiber portion to a known value of the first physical characteristic with a constant value of the second physical characteristic;

determine a spectral shift to generate a first proportionality constant;

determine an autocorrelation shift to generate a second proportionality constant;

subject the PM fiber portion to a known value of the second physical characteristic with a constant value of the first physical characteristic;

determine a spectral shift to generate a third proportionality constant; and determine an autocorrelation shift to generate a fourth proportionality constant.

30. Apparatus for analyzing a portion of a polarization maintaining (PM) optical fiber having two polarization states, comprising:

Optical Frequency Domain Reflectometry (OFDR) circuitry configured to determine first scatter data of the portion of the PM fiber for first values of temperature and strain and second scatter data of the PM fiber portion for second values of temperature and strain, where at least one of the temperature values or the strain values is different between the first and second sets; and a data processor configured to use the first and second scatter data to discriminate between strain and temperature at the portion of the PM fiber and to determine a change in strain or a change in temperature at the portion of the PM fiber; and provide a signal based on the determination of the change in strain or the change in temperature at the portion of the PM fiber.

31. The apparatus in claim 30, wherein the data processor is configured to: use Optical Frequency Domain Reflectometry (OFDR) to obtain the scatter data.

32. The apparatus in claim 31, wherein the data processor is configured to:

autocorrelate the first and second scatter data;

cross-correlate the first and second scatter data; and use results from the autocorrelating and the cross-correlating to discriminate between strain and temperature at the portion of the PM fiber and to determine a change in strain or a change in temperature at the portion of the PM fiber.

33. The apparatus in claim 31, wherein the strain and temperature vary at different locations along the PM fiber and the PM fiber portion is located any where along the PM fiber.

34. The apparatus in claim 31, wherein the scatter data are Rayleigh scatter patterns.

* * * * *